(12) United States Patent
Kelly

(10) Patent No.: US 10,780,646 B2
(45) Date of Patent: Sep. 22, 2020

(54) FRICTION PAD FOR A PORTABLE ELECTRONIC DEVICE

(71) Applicant: Matt Kelly, Park City, UT (US)

(72) Inventor: Matt Kelly, Park City, UT (US)

( * ) Notice: Subject to any disclaimer, the term of this patent is extended or adjusted under 35 U.S.C. 154(b) by 172 days.

(21) Appl. No.: 15/917,451

(22) Filed: Mar. 9, 2018

(65) Prior Publication Data

US 2018/0264745 A1 Sep. 20, 2018

Related U.S. Application Data

(60) Provisional application No. 62/564,514, filed on Sep. 28, 2017, provisional application No. 62/474,024, filed on Mar. 20, 2017.

(51) Int. Cl.
| | | |
|---|---|---|
| *B29C 65/48* | (2006.01) | |
| *B29C 65/00* | (2006.01) | |
| *C09J 7/24* | (2018.01) | |
| *C09J 7/30* | (2018.01) | |
| *C09J 5/00* | (2006.01) | |
| *B29L 31/16* | (2006.01) | |
| *B29K 23/00* | (2006.01) | |

(52) U.S. Cl.
CPC .............. *B29C 65/48* (2013.01); *B29C 66/71* (2013.01); *C09J 5/00* (2013.01); *C09J 7/243* (2018.01); *C09J 7/30* (2018.01); *B29K 2023/065* (2013.01); *B29L 2031/16* (2013.01); *C09J 2203/326* (2013.01); *C09J 2423/046* (2013.01); *C09J 2433/00* (2013.01)

(58) Field of Classification Search
CPC .......... B29C 65/48; B29C 66/71; C09J 7/243; C09J 7/30; C09J 5/00; C09J 2203/326; C09J 2423/046; C09J 2433/00; B29L 2031/16; B29K 2023/065
See application file for complete search history.

(56) References Cited

U.S. PATENT DOCUMENTS

| | | | | |
|---|---|---|---|---|
| 7,125,602 B2 | 10/2006 | Wheatley | | |
| 8,518,510 B1 * | 8/2013 | Wheatley | ................... | B32B 7/12 |
| | | | | 428/160 |
| 2004/0197500 A9 * | 10/2004 | Swoboda | ............... | B65D 65/42 |
| | | | | 428/34.2 |
| 2013/0022792 A1 * | 1/2013 | Antonini | .................. | B32B 25/20 |
| | | | | 428/172 |
| 2014/0335321 A1 * | 11/2014 | Reisman | ................. | B32B 38/06 |
| | | | | 428/172 |
| 2014/0377493 A1 * | 12/2014 | Wisnefsky | .............. | B32B 37/26 |
| | | | | 428/41.8 |

* cited by examiner

*Primary Examiner* — Nathan L Van Sell
(74) *Attorney, Agent, or Firm* — Roeder & Broder LLP; Steven G. Roeder

(57) ABSTRACT

A friction pad (12) for inhibiting movement of a device (10), e.g., a portable electronic device, relative to an engagement surface (16) includes a pad body (18) having a first body surface (20) and an opposed second body surface (22). The first body surface (20) is configured to be coupled to an outer surface (14) of the portable electronic device (10), and the second body surface (22) is configured to engage the engagement surface (16). The pad body (18) is formed at least in part from a body material (18A) including high-density polyethylene. Additionally, the second body surface (22) of the pad body (18) has a static coefficient of friction of at least approximately 0.60.

28 Claims, 3 Drawing Sheets

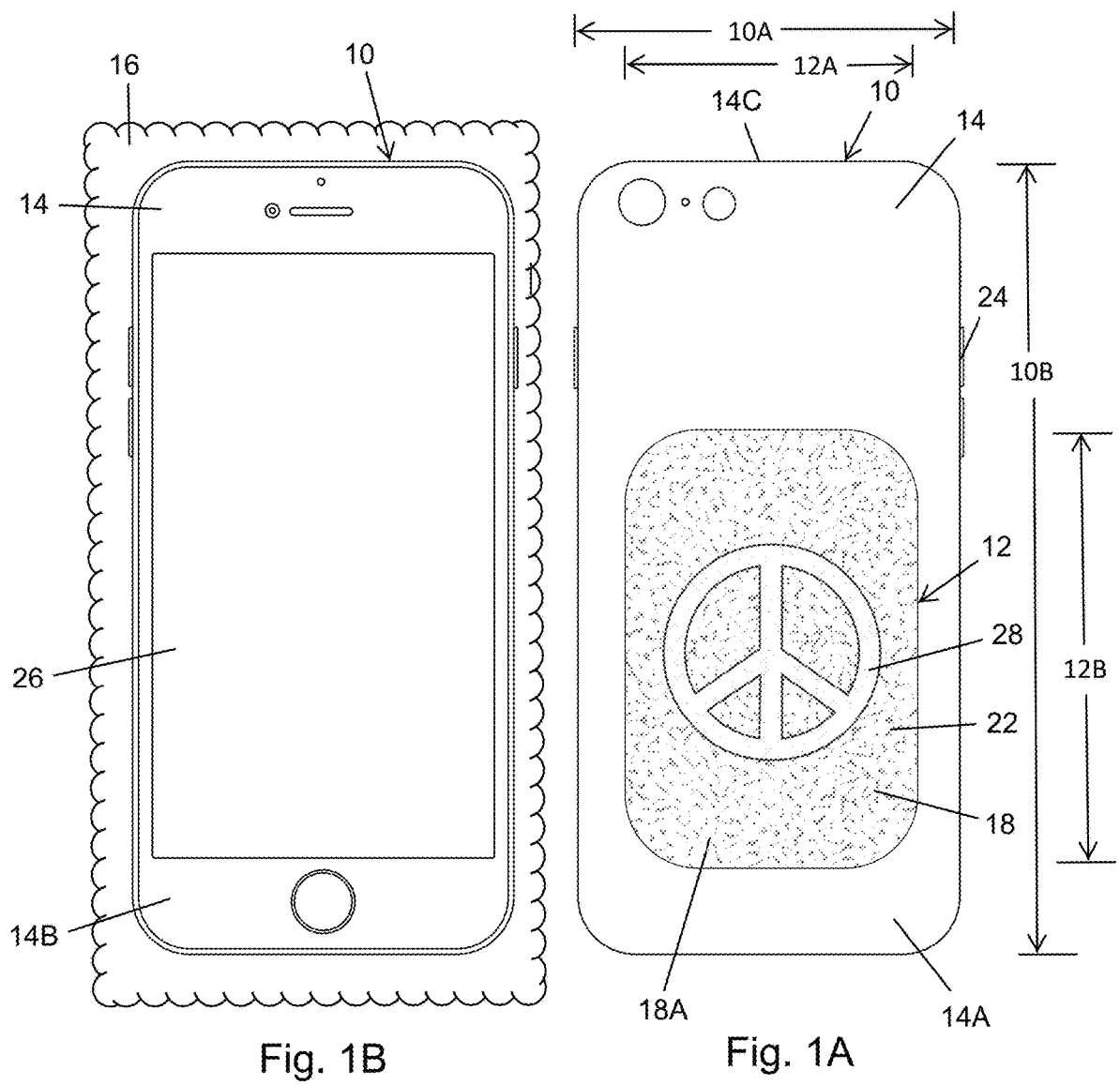

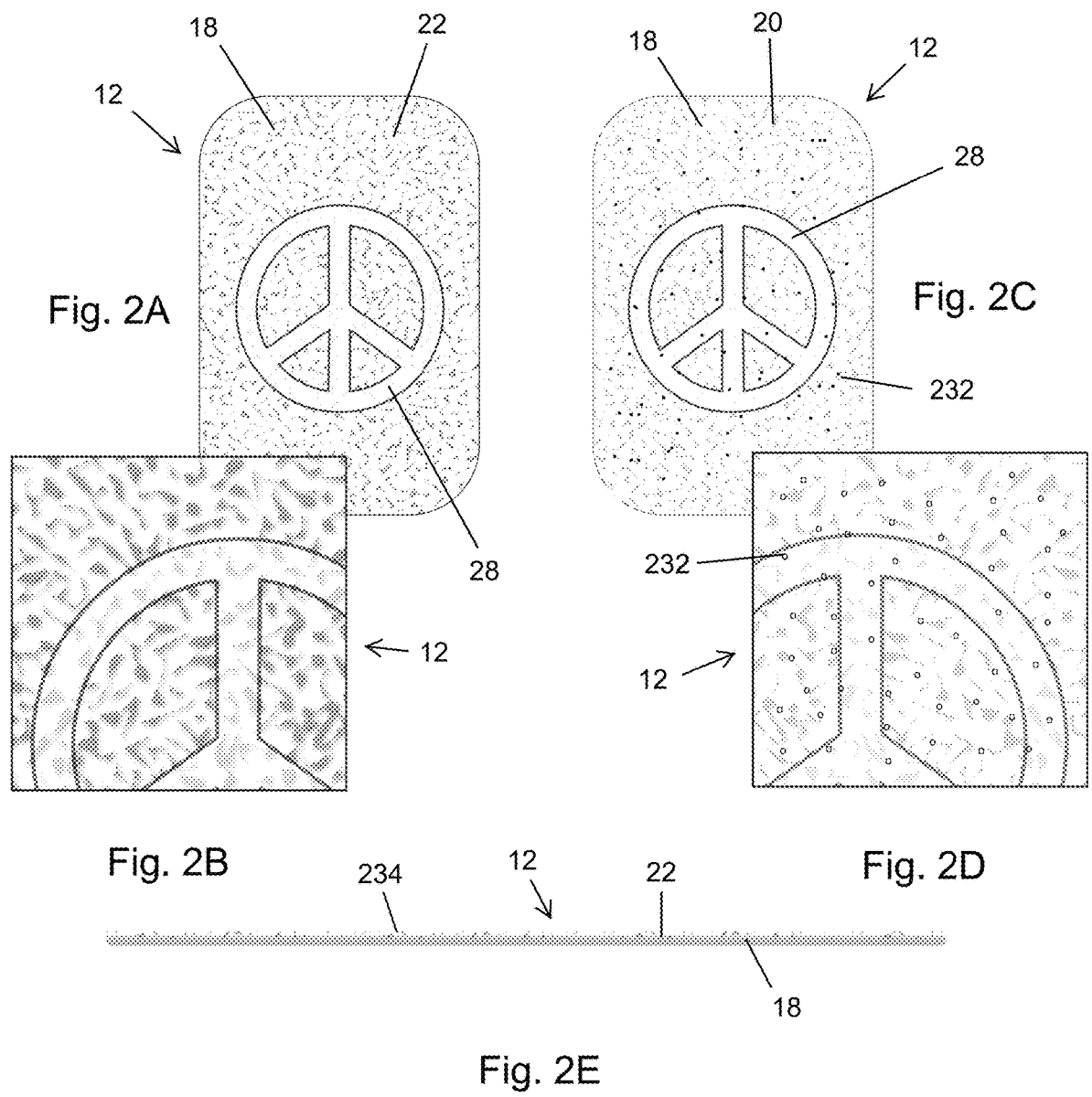

FRICTION PAD FOR A PORTABLE ELECTRONIC DEVICE

RELATED APPLICATION

This Application claims priority on (i) U.S. Provisional Application Ser. No. 62/564,514, filed on Sep. 28, 2017, and entitled "FRICTION PAD FOR A PORTABLE ELECTRONIC DEVICE", and (ii) U.S. Provisional Application Ser. No. 62/474,024 filed on Mar. 20, 2017, and entitled "FRICTION PAD FOR A PORTABLE ELECTRONIC DEVICE". To the extent permissible, the contents of U.S. Provisional Application Ser. Nos. 62/564,514 and 62/474,024 are incorporated in their entirety herein by reference.

BACKGROUND

As the years go by, people in general are getting more and more attached to any and all of their personal, portable electronic devices, e.g., smartphones, cellular phones, radios, CD players, MP3 players, video recorders, DVD players, tablet computers, laptop computers, etc. However, in many situations, people have issues holding onto their portable electronic devices or otherwise have trouble maintaining physical control and positioning of their portable electronic devices. Additionally, in other situations, people want to have ready access to their portable electronic devices without actually holding the devices. For example, people may want to have easy access to their portable electronic devices while performing various activities, but without actually having to hold the devices in their hands. Accordingly, it is desired to provide a means by which a user can more securely retain their portable electronic devices, e.g., in their hands and/or on a nearby surface. Additionally, it is further desired that the device can subsequently be removed from the surface without damaging or otherwise marring the device or the surface.

SUMMARY

The present invention is directed toward a friction pad for inhibiting movement of a device, e.g., a portable electronic device, relative to an engagement surface, the portable electronic device including an outer surface. In various embodiments, the friction pad includes a pad body having a first body surface and an opposed second body surface. The first body surface is configured to be coupled to the outer surface of the portable electronic device, and the second body surface is configured to engage the engagement surface. In such embodiments, the pad body is formed at least in part from a body material including high-density polyethylene. Additionally, the second body surface of the pad body has a static coefficient of friction of at least approximately 0.60.

The present invention is also directed toward a combination including a portable electronic device having an outer surface, and the friction pad as described above that is coupled to the outer surface of the portable electronic device. In some applications, the engagement surface is one of a desktop, a tabletop, and a countertop. Alternatively, in other applications, the engagement surface is a surface of a hand of a user.

In some embodiments, the second body surface of the pad body has a static coefficient of friction of at least approximately 1.50. Additionally, the second body surface of the pad body can have a static coefficient of friction of at least approximately 2.50.

Additionally, the second body surface can be an embossed or textured surface. In certain such embodiments, the embossed surface has a plurality of spaced apart surface features. In some embodiments, each of the surface features is spaced apart from adjacent surface features by between approximately 0.05 millimeters and 1.50 millimeters. Further, in certain embodiments, the surface features can have a feature height of between approximately 0.15 millimeters and 1.00 millimeters.

Additionally, in some embodiments, the pad body includes indicia that is visible at least when viewing the second body surface. Further, the pad body can also be at least partially translucent.

In certain embodiments, the body material has a shore hardness of between approximately 55 and 85. Moreover, the body material can have a density of between approximately 0.75 and 1.20 g/cm$^3$.

In some embodiments, the friction pad further includes an adhesive material on the first body surface such that the first body surface is configured to be fixedly coupled to the outer surface of the portable electronic device. In certain embodiments, the adhesive material is designed so that the first body surface is removably coupled to the outer surface of the portable electronic device. In some embodiments, the adhesive material can be a modified solvent acrylic.

The present invention is further directed toward a method for inhibiting movement of a portable electronic device relative to an engagement surface, the portable electronic device including an outer surface, the method including the steps of (i) providing a pad body having a first body surface and an opposed second body surface; (ii) coupling the first body surface to the outer surface of the portable electronic device; and (iii) positioning the pad body so that the second body surface engages the engagement surface; wherein the pad body is formed at least in part from a body material including high-density polyethylene; and wherein the second body surface of the pad body has a static coefficient of friction of at least approximately 0.60.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1A is a simplified rear view illustration of a device and an embodiment of a friction pad having features of the present invention that is secured to the device;

FIG. 1B is a simplified front view illustration of the device illustrated in FIG. 1A, the device being positioned on an engagement surface;

FIG. 1C is a simplified side view illustration of the device and the friction pad illustrated in FIG. 1A;

FIG. 2A is a simplified plan view illustration of a second body surface of the friction pad illustrated in FIG. 1A;

FIG. 2B is a simplified enlarged plan view illustration of a portion of the second body surface of the friction pad illustrated in FIG. 2A;

FIG. 2C is a simplified plan view illustration of a first body surface of the friction pad illustrated in FIG. 2A;

FIG. 2D is a simplified enlarged plan view illustration of a portion of the first body surface of the friction pad illustrated in FIG. 2A; and FIG. 2E is a simplified enlarged side view illustration of the friction pad illustrated in FIG. 2A;

DESCRIPTION

Figure 3A:
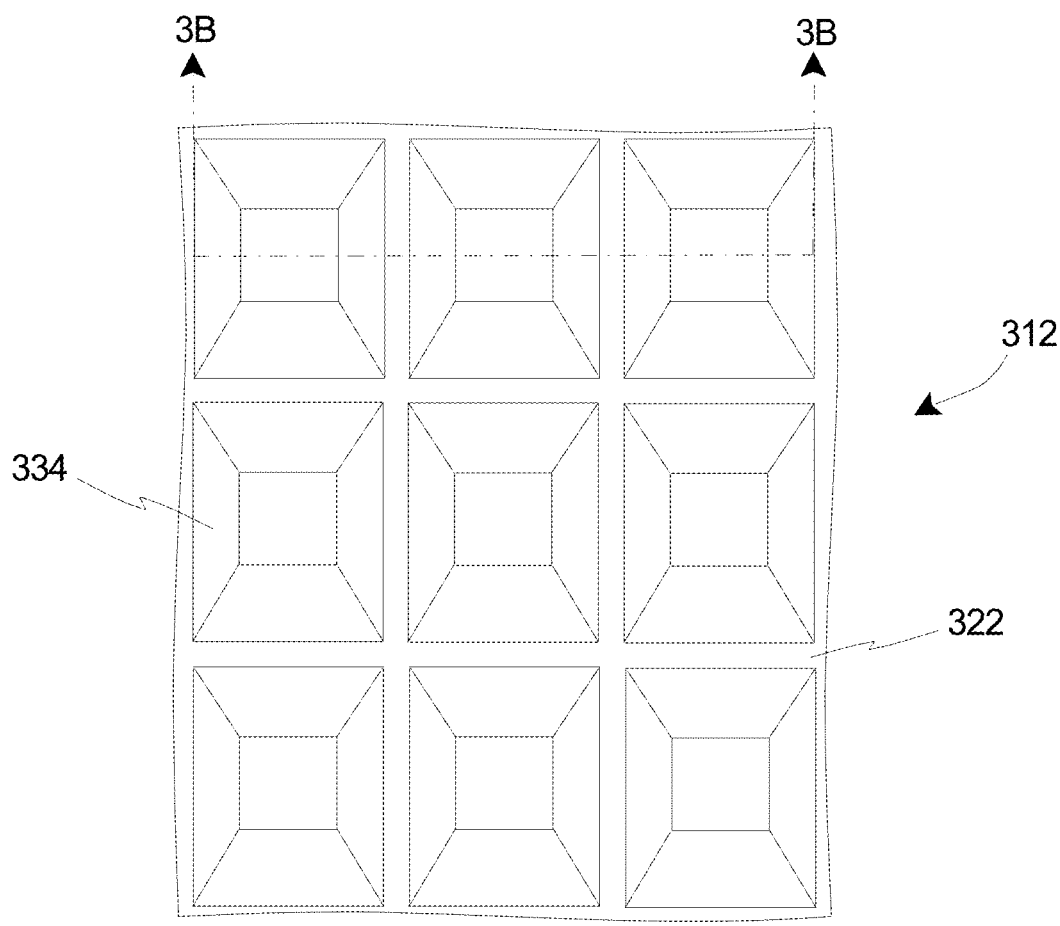
FIG. 3A is a simplified schematic top view illustration of a portion of another embodiment of the friction pad.

Embodiments of the present invention are described herein in the context of a friction pad that can be selectively coupled to an outer surface of a device, e.g., a portable electronic device, for enabling a user to more securely retain the device. For example, in some embodiments, the friction pad can be utilized to enable the user to more securely retain the device in a hand of the user. Additionally and/or alternatively, the friction pad can also be utilized to enable the user to securely retain the device along a surface, e.g., a desktop, a tabletop, a countertop, etc.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1A is a simplified rear view illustration of a device 10 and an embodiment of a friction pad 12 having features of the present invention that is coupled to the device 10.

In some embodiments, the device 10 can be a portable electronic device such as a smartphone, a cellular phone, a radio, a CD player, an MP3 player, a video recorder, a DVD player, a tablet computer, a laptop computer, etc. Further, each electronic device 10 can include one or more processors and/or electronic storage devices. Alternatively, the device 10 can be another type of device.

As illustrated, the device 10 includes an outer surface 14, e.g., a rear surface 14A, a front surface 14B (illustrated in FIG. 1B), and one or more side surfaces 14C that extend between the rear surface 14A and the front surface 14B. In the embodiment shown in FIG. 1A, the device 10 is substantially rectangle-shaped. Alternatively, the device 10 can have another suitable shape. For example, in some non-exclusive alternative embodiments, the device 10 can be substantially triangle-shaped, square-shaped, hexagon-shaped, octagon-shaped, circle-shaped or oval-shaped.

As an overview, in certain embodiments, the friction pad 12 is uniquely configured to help maintain the desired positioning of the device 10 relative to an engagement surface 16 (illustrated in FIG. 1B). More specifically, the friction pad 12 can include a pad body 18 having a first body surface 20 (illustrated in FIG. 1C) that is configured to be coupled to the outer surface 14, e.g., the rear surface 14A or the front surface 14B, of the device 10, and an opposed second body surface 22 that is configured to engage and/or be coupled to the engagement surface 16, i.e. to maintain the position of the device 10 relative to the engagement surface 16 and/or to inhibit movement of the device 10 relative to the engagement surface 16. Additionally, as provided in detail herein, the second body surface 22 and/or the pad body 18 can include certain features, characteristics, properties and specifications that enable the pad body 18 to better serve its intended purpose.

The friction pad 12 can be any suitable size to suit the specific requirements of the device 10 with which the friction pad 12 is to be used. For example, the friction pad 12 can typically be somewhat smaller than the portion of the outer surface 14 of the device 10, e.g., the rear surface 14A of the device 10 in the embodiment specifically illustrated in FIG. 1A, to which the friction pad 12 is coupled. Additionally, the friction pad 12 should still be sufficiently large that it can effectively retain the position of the device 10 relative to the engagement surface 16. However, it is appreciated that the friction pad 12 should not be too large so as to inhibit the ability of the user to effectively use the various features and components of the device 10. More specifically, the friction pad 12 should not be too large and should not be positioned along the outer surface 14 of the device 10 to inhibit access to any control features 24, e.g., buttons, tabs, etc. or display features 26 (illustrated in FIG. 1B), e.g., video screens, of the device 10.

As illustrated in FIG. 1A, the device 10 can have a device width 10A and a device length 10B. Further, the friction pad 12 has a pad width 12A and a pad length 12B. In certain embodiments, the friction pad 12 is designed so that the pad width 12A is equal to or less than the device width 10A, and the pad length 12B is equal to or less than the device length 10B. For example, in some such embodiments, the pad width 12A can be between approximately fifty percent (50%) and one hundred percent (100%) of the device width 10A; and the pad length 12B can be between approximately fifty percent (50%) and one hundred percent (100%) of the device length 10B.

Additionally, the pad body 18 of the friction pad 12 can be formed from any suitable materials for purposes of effectively maintaining the position of the device 10 relative to the engagement surface 16. For example, in one non-exclusive alternative embodiment, the pad body 18 is formed at least in part from a body material 18A that includes high-density polyethylene (HDPE), which is a polyethylene thermoplastic made from petroleum and that is known for its large strength-to-density ratio. In particular, in such embodiment, at least the second body surface 22, which is configured to engage the engagement surface 16, includes the body material 18A that is formed from HDPE. Additionally and/or alternatively, the body material 18A of the pad body 18 can include other suitable materials. Further, in some embodiments, the pad body 18 can be formed from a plurality of layers. In such embodiments, each layer can be formed from similar materials, or one or more of the plurality of layers can be formed from different materials.

In one embodiment, the entire pad body 18 is made of HDPE.

In some embodiments, the body material 18A of the pad body 18, i.e. of at least the second body surface 22, can have a density of between approximately 0.75 and 1.20 g/cm$^3$. More particularly, in certain such embodiments, the body material 18A of the pad body 18, i.e. of at least the second body surface 22, can have a density of between approximately 0.90 and 1.00 g/cm³. Alternatively, the body material 18A can have a density that is different than the ranges specifically noted herein.

Additionally, in certain embodiments, the body material 18A of the pad body 18 can have a shore hardness of between approximately 55 and 85. Shore hardness of a material is defined by the material's resistance to permanent indentation. For example, in some such embodiments, the body material 18A can have a shore hardness of at least approximately 55, 60, 65, 70, 75, 80 or 85. Alternatively, the body material 18A of the pad body 18 can have a shore hardness that is greater than 85 or less than 55.

Further, in some non-exclusive alternative embodiments, the body material 18A can be formed such that the second body surface 22 has a static coefficient of friction of at least approximately 0.60. The higher the static coefficient of friction is of the second body surface 22, the better the friction pad 12 is able to effectively grip the engagement surface 16 so as to inhibit the device 10 from moving relative to the engagement surface 16. For example, in some, alternative, non-exclusive embodiments, the second body surface 22 can have a static coefficient of friction of (i) between 0.60 and 3.00; (ii) between 0.60 and 0.85; (iii) between 0.80 and 1.10; (iv) between 1.05 and 1.35; (v) between 1.30 and 1.60; (vi) between 1.55 and 1.85; (vii) between 1.80 and 2.10; (viii) between 2.05 and 2.35; (ix) between 2.30 and 2.60; (x) between 2.55 and 2.80; or (xi) between 2.75 and 3.00. More specifically, in certain non-exclusive embodiments, the second body surface 22 can have a static coefficient of friction of at least 0.60, 0.65, 0.70, 0.75, 0.80, 0.85, 0.90, 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95 or 3.00. Alternatively, the body material 18A can be formed such that the second body surface 22 has a static coefficient of friction that is less than 0.60 or greater than 3.00.

In some embodiments, as shown in FIG. 1A, the friction pad 12 can include some type of indicia 28 that is formed on or into the pad body 18. For example, in certain such embodiments, the indicia 28 can be formed directly onto or into the second body surface 22 of the pad body 18. Alternatively, the indicia 28 can be included within a different layer of the pad body 18 and/or can be provided in the form of another layer of the pad body 18.

The indicia 28 can have any suitable design. For example, the indicia 28 can include a logo, a design, a symbol, a picture, an advertisement, a product or company name, or some other type of indicia.

Additionally, in various embodiments, the second body surface 22 can be formed to include an embossed surface and/or a textured surface. For example, the embossing or texturing of the second body surface 22 can be manufactured through a specifically designed embossing process. In particular, in some embodiments, the embossing process entails the use of an embossing roller which is effectively a highly accurate mangle that uses a nip process running at speed to bring the material at pressure underneath a debossed steel bar.

It is appreciated that the particular design or design features included within the embossed surface or textured surface can be varied as desired. As such, the scope of the present invention is not intended to be limited in any manner by the illustration of any particular embossing or texturing design in the included Figures or any specific designs that may be mentioned herein.

In certain embodiments, the embossing or texturing design can include a plurality of surface features 234 (as shown in FIG. 2E) that can be spaced apart from one another. For example, in some such embodiments, the surface features 234 of the embossed or textured surface can be spaced apart from one another, i.e. from adjacent surface features 234, by between approximately 0.05 millimeters and 1.50 millimeters. Alternatively, the spacing between the surface features 234 can be greater than or less than the specific limitations noted above.

Additionally, the surface features 234 can be of any suitable size and shape depending on the particular design of the surface features 234. Accordingly, the illustration and description of any particular designs for the surface features 234 herein is not intended to be limiting in any manner.

Further, in some embodiments, the surface features 234 can be configured to have a height, e.g., a peak-to-valley distance, of between approximately 0.15 millimeters and 1.00 millimeters. More specifically, in some such embodiments, the surface features 234 can be configured to have a height, e.g., a peak-to-valley distance, of between approximately 0.15 millimeters and 0.25 millimeters. Alternatively, the peak-to-valley distance of the surface features 234 can be greater than or less than the specific limitations noted above. Stated in another fashion, in alternative, non-exclusive embodiments, the surface features 234 are configured to have a peak-to-valley distance of at least 0.1, 0.15, 0.2, 0.25, 0.3, 0.4, 0.5, 0.6, 0.7, 0.8, 0.9, or 1 millimeters.

FIG. 1B is a simplified front view illustration of the device 10 illustrated in FIG. 1A. Additionally, the device 10 is illustrated in FIG. 1B as being coupled to and/or being positioned on the engagement surface 16.

It is appreciated that the engagement surface 16 can be any suitable type of surface, and the engagement surface 16 can be either substantially planar or can include certain contours. For example, in certain applications, the engagement surface 16 can be a hand or a leg of a user of the device 10. In such applications, the friction pad 12 (illustrated in FIG. 1A) can make it much easier for the user to hold onto the device, i.e. without dropping the device 10 or without otherwise losing physical control of the device 10. In other applications, the engagement surface 16 can be any suitable surface that may be near the user while the user is performing an activity that makes actual holding of the device 10 difficult in any manner. In such applications, the friction pad 12 can be utilized to maintain the position of the device 10 relative to the engagement surface 16, and to inhibit movement of the device 10 relative to the engagement surface 16. More specifically, the user can merely want to keep the device 10 in a substantially constant position, i.e. without the device 10 sliding around on the engagement surface 16, so that the device 10 is easier to use. In such other applications, the engagement surface 16 can be a desktop, a tabletop, a countertop, or another suitable engagement surface 16.

Additionally, FIG. 1B also illustrates certain features or aspects of the device 10. More particularly, FIG. 1B illustrates that the outer surface 14 of the device 10 includes the front surface 14B into which the display features 26 such as a video screen can be formed.

Further, in various embodiments, the body material 18A (illustrated in FIG. 1A) of the pad body 18 (illustrated in FIG. 1A) is designed so that the friction pad 12, when coupled to the device 12, can be positioned to engage the engagement surface 16 and subsequently be removed from the engagement surface 16 without marring or otherwise damaging the engagement surface 16. For example, it is appreciated that many surfaces, such as a desktop, a tabletop, or a countertop, can have a finished surface configured to be aesthetically pleasing. Such surfaces can be formed of various alternative materials, and can be expensive to replace or repair. Thus, it can be desired to design the body material 18A so that the selectively coupling of the friction pad 12 to the engagement surface 16 will not mar or otherwise damage the engagement surface 16.

FIG. 1C is a simplified side view illustration of the device 10 and the friction pad 12 illustrated in FIG. 1A. In particular, FIG. 1C illustrates the first body surface 20 of the friction pad 12 being coupled to the outer surface 14, i.e. the rear surface 14A, of the device 10. FIG. 1C also illustrates the opposed, second body surface 22 of the friction pad 12.

Additionally, FIG. 1C also illustrates a pad thickness 30 of the pad body 18 of the friction pad 12. The pad body 18 can have any suitable pad thickness 30. For example, in some embodiments, the pad body 18 can have a pad thickness 30 of between approximately 0.675 millimeters (0.025 inches) and 2.54 millimeters (0.10 inches). Alternatively, the pad thickness 30 of the pad body 18 can be greater than 2.54 millimeters or less than 0.675 millimeters.

With this design, the friction pad 12 is a resilient, thick sticker that is secured to the device 10 to enhance how the device 10 is retained.

FIGS. 2A-2E provide alternative simplified illustrations of the friction pad 12. More specifically, FIG. 2A is a simplified plan view illustration of the friction pad 12, i.e. looking at the second body surface 22 of the pad body 18 of the friction pad 12; FIG. 2B is a simplified enlarged plan view illustration of a portion of the second body surface 22 of the friction pad 12 illustrated in FIG. 2A; FIG. 2C is a simplified plan view illustration of the friction pad 12 illustrated in FIG. 2A, i.e. looking at the first body surface 20 of the pad body 18 of the friction pad 12; FIG. 2D is a simplified enlarged plan view illustration of a portion of the first body surface 20 of the friction pad 12 illustrated in FIG. 2A; and FIG. 2E is a simplified enlarged side view illustration of the friction pad 12 illustrated in FIG. 2A.

FIGS. 2A-2E illustrate certain additional features and aspects of the friction pad 12 that were not readily visible or apparent in FIGS. 1A-1C. For example, in FIG. 2A, the indicia 28 is clearly visible on or through the second body surface 22. Additionally, in FIG. 2C, the indicia 28 is also somewhat visible when looking directly at the first body surface 20. The indicia 28 is visible when looking at the second body surface 22 even if the indicia 28 is not formed directly on or into the second body surface 22, and is also visible when looking at the first body surface 20, because in many embodiments, at least a portion of the pad body 18 is at least partially translucent or transparent.

The type of indicia 28 integrated into the friction pad 12 can vary. As alternative, non-exclusive embodiments, the indicia 28 can be a peace symbol, team logos, artwork, objects, or scenes that is formed on or into the friction pad 12.

Additionally, FIGS. 2C and 2D also illustrate an adhesive material 232 (illustrated as small dots) that may be provided on the first body surface 20. The adhesive material 232 can be utilized to effectively couple the friction pad 12 to the outer surface 14 (illustrated in FIG. 1A) of the device 10 (illustrated in FIG. 1A). In particular, in certain embodiments, the adhesive material 232 can be utilized to fixedly couple the first body surface 20 of the friction pad 12 to the outer surface 14 of the device 10. As utilized herein, the term "fixedly couple" signifies that the coupling between the first body surface 20 of the friction pad 12 and the outer surface 14 of the device 10 is substantially permanent so that the friction pad 12 cannot be easily or readily removed from the outer surface 14 of the device 10. Alternatively, in other embodiments, the first body surface 20 can be removably coupled to the outer surface 14 of the device 10. In one non-exclusive embodiment, the adhesive material 232 is a modified solvent acrylic. Alternatively, the adhesive material 232 can be another suitable material.

It is appreciated that with the use of the adhesive material 232 to fixedly couple the friction pad 12 to the outer surface 14 of the device 10, the attachment between the device 10 and the friction pad 12 is greater or stronger than the attachment between the friction pad 12 and the engagement surface 16 (illustrated in FIG. 1B). Such design enables a user to easily remove the device 10 with the friction pad 12 attached thereto from the engagement surface 16, without the friction pad 12 separating from the device 10. For example, in certain non-exclusive alternative embodiments, the attachment between the device 10 and the friction pad 12 is at least approximately 10%, 20%, 30%, 40%, 50%, 60%, 70%, 80%, 90% or 100% stronger than the attachment between the friction pad 12 and the engagement surface 16. It is further appreciated, however, that in certain embodiments, it can still be desired that the friction pad 12 is removable from the outer surface 14 of the device 10 without damaging or otherwise marring the appearance of the friction pad 12 or the outer surface 14 of the device 10.

Further, in some embodiments, the friction pad 12 can include a backing layer (not shown) that can be positioned over the first body surface 20 so as to cover the adhesive material 232 on the first body surface 20. The backing layer prevents or resists the friction pad 12 from sticking or clinging to any surfaces when not intended. Subsequently, upon removal of the backing layer, the friction pad 12 can then be quickly and easily coupled to the device 10 as desired.

As noted above, FIG. 2E also illustrates the plurality of surface features 234 that can formed on or into the second body surface 22 of the pad body 18.

FIG. 3A is a simplified schematic top view illustration of a portion of another embodiment of the friction pad 312. In particular, FIG. 3A is a simplified schematic view illustration of a portion of the friction pad 312 looking at the second surface 322 of the friction pad 312, i.e. the surface of the friction pad 312 that is configured to engage the engagement surface 16 (illustrated in FIG. 1B).

As illustrated in FIG. 3A, the friction pad 312 can include a plurality of surface features 334 that are spaced apart from one another. More specifically, FIG. 3A illustrates the plurality of surface features 334 in a waffle-like design pattern. Alternatively, the friction pad 312 and/or the plurality of surface features 334 can have a different design than what is illustrated in FIG. 3A. Additionally, the plurality of surface features 334 can be positioned in a different manner relative to one another.

Figure 3B:
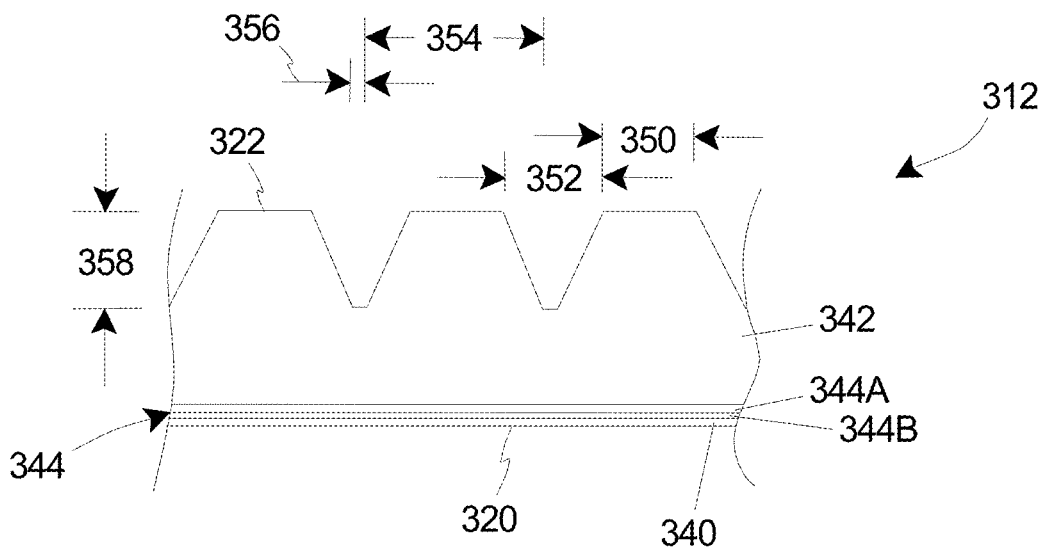
FIG. 3B is a cutaway view of the portion of the friction pad illustrated in FIG. 3A taken on line 3B-3B.

FIG. 3B is a cutaway view of the portion of the friction pad 312 illustrated in FIG. 3A taken on line 3B-3B. In particular, FIG. 3B illustrates that the friction pad 312 can be formed from a plurality of layers of material. Additionally, FIG. 3B illustrates certain design features that can be incorporated into each of the plurality of layers of material.

The design of the friction pad 312 can be varied. In certain embodiments, as shown in FIG. 3B, the friction pad 312 can include (i) a first layer 340 that incorporates the first surface 320 that is configured to engage and be secured to the device 10 (illustrated in FIG. 1A), i.e. an outer surface 14 (illustrated in FIG. 1A) of the device 10, (ii) a second layer 342 that incorporates the second surface 322 that is configured to selectively engage the engagement surface 16 (illustrated in FIG. 1B), and (iii) one or more inner layers 344 that are positioned substantially between the first layer 340 and the second layer 342.

As noted, the first layer 340 is configured to engage and be secured to an outer surface 14 of the device 10. In some embodiments, the first layer 340 can be an adhesive layer that enables secure bonding between the friction pad 312 and the device 10. For example, in certain such embodiments, the first (adhesive) layer 340 can be formed from an adhesive material such as a modified solvent acrylic. Alternatively, the first layer 340 can have a different design and/or be formed from different materials, e.g., different adhesive materials.

Additionally, as noted, the second layer 342 of the friction pad 312 is configured to selectively engage the engagement surface 16 so as to better maintain the positioning of the device 10 relative to the engagement surface 16. In various embodiments, as provided in detail above, the second layer 342 can be formed from high-density polyethylene (HDPE). Alternatively, the second layer 342 can be formed from other suitable materials.

Additionally, as shown, the second layer 342 can include the plurality of surface features 334. The size and shape of the surface features 334 can be varied as desired. As illustrated in FIG. 3B, the surface features 334 can have an upper surface width 350, an upper surface spacing 352 (i.e. between adjacent surface features 334), a lower surface width 354, a lower surface spacing 356 (i.e. between adjacent surface features 334), and a feature height 358 (i.e. a feature peak-to-valley distance). The dimensions of each of the features and aspects of the surface features 334 can be varied.

In certain non-exclusive embodiments, (i) the upper surface width 350 of the surface features 334 can be between approximately 1.35 millimeters and 2.05 millimeters; (ii) the upper surface spacing 352 between adjacent surface features 334 can be between approximately 1.15 millimeters and 1.50 millimeters; (iii) the lower surface width 354 of the surface features 334 can be between approximately 2.50 millimeters and 3.50 millimeters; (iv) the lower surface spacing 356 between adjacent surface features 334 can be between approximately 0.05 millimeters and 0.15 millimeters; and (v) the feature height 358 of the surface features 334 can be between approximately 1.00 millimeters and 2.00 millimeters. Alternatively, the upper surface width 350, the upper surface spacing 352, the lower surface width 354, the lower surface spacing 356, and the feature height 358 can be different than, i.e. greater than or less than, the dimensions specifically noted herein above.

In some embodiments, the one or more inner layers 344 can be included in order to provide the indicia 28 (illustrated in FIG. 1A). Additionally, the positioning of the inner layers 344 between the first layer 340 and the second layer 342 can be configured to protect the indicia 28 from potentially delaminating from the remainder of the friction pad 312 during use and aging of the friction pad 312. In particular, in this embodiment, the one or more inner layers 344 can function as an indicia layer assembly. For example, as shown, the indicia layer assembly 344 can include an ink layer 344A and an indicia substrate 344B.

For purposes of using the indicia layer assembly 344, the ink layer 344A is positioned on a surface of the indicia substrate 344B. It is appreciated that the ink layer 344A can be positioned on either surface of the indicia substrate 344B, i.e. such that the ink layer 344A will be on the surface of the indicia substrate 344B closer to the second layer 342, or such that the ink layer 344A will be on the surface of the indicia substrate 344B closer to the first layer 340.

In certain embodiments, the ink layer 344A can utilize an ultraviolet (UV) ink, e.g., a UV curable ink, that provides a glossy appearance. For example, in one non-exclusive alternative embodiment, the ink layer 344A can utilize Amplifi AMP UV Ink from Fujifilm Corporation, which is headquartered in Tokyo, Japan. Alternatively, the ink layer 344A can utilize another suitable ink.

Additionally, in some embodiments, the indicia substrate 344B can be formed from polyethylene, polypropylene, polystyrene, or another suitable material. In some such embodiments, the indicia substrate 344B can be formed from polyethylene or polypropylene materials having a surface tension level of at least approximately thirty-eight dynes per centimeter.

It is understood that although a number of different embodiments of the friction pad 12 have been illustrated and described herein, one or more features of any one embodiment can be combined with one or more features of one or more of the other embodiments, provided that such combination satisfies the intent of the present invention.

While a number of exemplary aspects and embodiments of the friction pad 12 have been discussed herein above, those of skill in the art will recognize certain modifications, permutations, additions and sub-combinations thereof. It is therefore intended that the friction pad 12 shall be interpreted to include all such modifications, permutations, additions and sub-combinations as are within their true spirit and scope, and no limitations are intended to the details of construction or design herein shown.

What is claimed is:

1. A friction pad for inhibiting movement of a portable electronic device relative to an engagement surface, the portable electronic device including an outer surface, the friction pad comprising:
a pad body having a first body surface and an opposed second body surface, the first body surface being configured to be coupled to the outer surface of the portable electronic device, and the second body surface being configured to engage the engagement surface, the pad body being formed at least in part from a body material including high-density polyethylene, the second body surface of the pad body having a static coefficient of friction of at least approximately 1.0, and the second body surface including a plurality of spaced apart surface features, each of the plurality of surface features having a feature height of between approximately 0.15 millimeters and 1.00 millimeters; and
an adhesive material on the first body surface such that the first body surface is configured to be fixedly coupled to the outer surface of the portable electronic device.

2. A combination comprising a portable electronic device having an outer surface, and the friction pad of claim 1 that is coupled to the outer surface of the portable electronic device.

3. The combination of claim 2 wherein the engagement surface is one of a desktop, a tabletop, and a countertop.

4. The combination of claim 2 wherein the engagement surface is a surface of a hand of a user.

5. The friction pad of claim 1 wherein the second body surface of the pad body has a static coefficient of friction of at least approximately 1.50.

6. The friction pad of claim 1 wherein the second body surface of the pad body has a static coefficient of friction of at least approximately 2.50.

7. The friction pad of claim 1 wherein the pad body includes indicia that is visible when viewing the second body surface.

8. The friction pad of claim 1 wherein the pad body is at least partially translucent.

9. The friction pad of claim 1 wherein the adhesive material is modified solvent acrylic.

10. The friction pad of claim 1 wherein the first body surface is configured to be removably coupled to the outer surface of the portable electronic device.

11. The friction pad of claim 1 wherein the second body surface is an embossed surface.

12. The friction pad of claim 11 wherein the embossed surface includes the plurality of spaced apart surface features.

13. The friction pad of claim 12 wherein each of the surface features is spaced apart from adjacent surface features by between approximately 0.05 millimeters and 1.50 millimeters.

14. The friction pad of claim 1 wherein the body material has a shore hardness of between approximately 55 and 85.

15. The friction pad of claim 1 wherein the body material has a density of between approximately 0.75 and 1.20 g/cm$^3$.

16. The friction pad of claim 1 wherein the feature height of each of the plurality of surface features is between approximately 0.15 millimeters and 0.25 millimeters.

17. The friction pad of claim 1 wherein the feature height of each of the plurality of surface features is at least approximately 0.25 millimeters.

18. The friction pad of claim 1 wherein the feature height of each of the plurality of surface features is at least approximately 0.5 millimeters.

19. The friction pad of claim 1 wherein the feature height of each of the plurality of surface features is at least approximately 0.8 millimeters.

20. A combination comprising a portable electronic device having an outer surface, and a friction pad that is coupled to the outer surface of the portable electronic device for inhibiting movement of the portable electronic device relative to an engagement surface, the friction pad comprising a pad body having a first body surface and an opposed second body surface, the first body surface being configured to be coupled to the outer surface of the portable electronic device, and the second body surface being configured to engage the engagement surface, the pad body being formed at least in part from a body material including high-density polyethylene, the second body surface of the pad body having a static coefficient of friction of at least approximately 1.0, and the second body surface including a plurality of spaced apart surface features, each of the plurality of surface features having a feature height of between approximately 0.15 millimeters and 1.00 millimeters.

21. The combination of claim 20 wherein the pad body includes indicia that is visible when viewing the second body surface.

22. The combination of claim 20 wherein the pad body is at least partially translucent.

23. The combination of claim 20 wherein the first body surface is configured to be removably coupled to the outer surface of the portable electronic device.

24. The combination of claim 20 wherein the second body surface is an embossed surface.

25. The combination of claim 24 wherein the embossed surface includes the plurality of spaced apart surface features.

26. The combination of claim 25 wherein each of the surface features is spaced apart from adjacent surface features by between approximately 0.05 millimeters and 1.50 millimeters.

27. The combination of claim 20 wherein the body material has a shore hardness of between approximately 55 and 85.

28. The combination of claim 20 wherein the body material has a density of between approximately 0.75 and 1.20 g/cm$^3$.

* * * * *